US012681700B2

(12) United States Patent  
Furst et al.

(10) Patent No.: US 12,681,700 B2  
(45) Date of Patent: Jul. 14, 2026

(54) SELECTING INTERMEDIATE REPRESENTATION TRANSFORMATIONS FOR COMPILATIONS

(71) Applicant: Advanced Micro Devices, Inc., Santa Clara, CA (US)

(72) Inventors: Emily Anne Furst, Duvall, WA (US); Robin Conradine Knauerhase, Portland, OR (US); Sangeeta Chowdhary, Sunnyvale, CA (US); Michael L Chu, San Jose, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 156 days.

(21) Appl. No.: 18/342,347

(22) Filed: Jun. 27, 2023

(65) Prior Publication Data  
US 2025/0004730 A1    Jan. 2, 2025

(51) Int. Cl.  
*G06F 8/41*        (2018.01)

(52) U.S. Cl.  
CPC ...................................... *G06F 8/41* (2013.01)

(58) Field of Classification Search  
None  
See application file for complete search history.

(56) References Cited

U.S. PATENT DOCUMENTS

| | | | | |
|---|---|---|---|---|
| 9,268,537 B1 * | 2/2016 | Zhang | ........................ | G06F 8/35 |
| 2014/0359559 A1 * | 12/2014 | Qi | ............................ | G06F 8/35 |
| | | | | 717/105 |

| | | | | |
|---|---|---|---|---|
| 2020/0301681 A1 * | 9/2020 | Haehnle | ................... | G06F 8/433 |
| 2023/0071047 A1 * | 3/2023 | Carames | ............... | G06F 9/5005 |
| 2024/0028943 A1 * | 1/2024 | Izaac | ...................... | G06N 10/20 |
| 2024/0378089 A1 * | 11/2024 | Berson | .................... | G06F 8/441 |

OTHER PUBLICATIONS

Amini, Mehdi , et al., "MLIR: Multi-Level Intermediate Representation", Mehdi Amini and River Riddle [retrieved Mar. 13, 2023]. 2020, 78 Pages.

Chelini, Lorenzo , et al., "Progressive Raising in Multi-level IR", International Symposium on Code Generation and Optimization (CGO)[retrieved Mar. 13, 2023]., Feb. 12, 2021, 13 Pages.

Finkel, Hal , et al., "ClangJIT: Enhancing C++ with Just-in-Time Compilation", Cornell University arXiv, arXiv.org [retrieved Mar. 13, 2023]. . . , Apr. 27, 2019, 11 Pages.

Huang, Qijing , et al., "AutoPhase: Compiler Phase-Ordering for HLS with Deep Reinforcement Learning", IEEE 27th Annual International Symposium on Field-Programmable Custom Computing Machines [retrieved Mar. 13, 2023]. . . , May 2019, 1 Page.

* cited by examiner

*Primary Examiner* — Lewis A Bullock, Jr.  
*Assistant Examiner* — Mark A Gooray  
(74) *Attorney, Agent, or Firm* — FIG. 1 Patents

(57) ABSTRACT

Selecting intermediate representation transformation for compilations is described. In accordance with the described techniques, source code is received to be compiled by a compilation system for execution by a processor of hardware. Intermediate representation transformations are selected for the source code based on system load information associated with the hardware. The intermediate representation transformations are output to the compilation system.

20 Claims, 5 Drawing Sheets

400

---

402
Receive source code to be compiled by a compilation system for execution by a processor of hardware having a particular configuration

---

404
Select intermediate representation transformations for the source code based on the particular configuration

---

406
Output the intermediate representation transformations to the compilation system

---

500

502
Receive source code to be compiled by a compilation system for execution by a processor of hardware 504
Select intermediate representation transformations for the source code based on system load information associated with the hardware 506
Output the intermediate representation transformations to the compilation system

SELECTING INTERMEDIATE REPRESENTATION TRANSFORMATIONS FOR COMPILATIONS

BACKGROUND

Intermediate representations are conceptual structures utilized by a compiler to optimize translation of high-level source code into low-level machine code. The low-level machine code is executable by a processor, and different types of intermediate representations are used to optimize compilation of the source code for execution by different types of processors in different hardware configurations. For instance, the compiler uses a first series of intermediate representations to compile the source code for execution by a central processing unit and the compiler uses a second series of intermediate representations to compile the source code for execution by a graphics processing unit.

DETAILED DESCRIPTION

Overview

Figure 1:
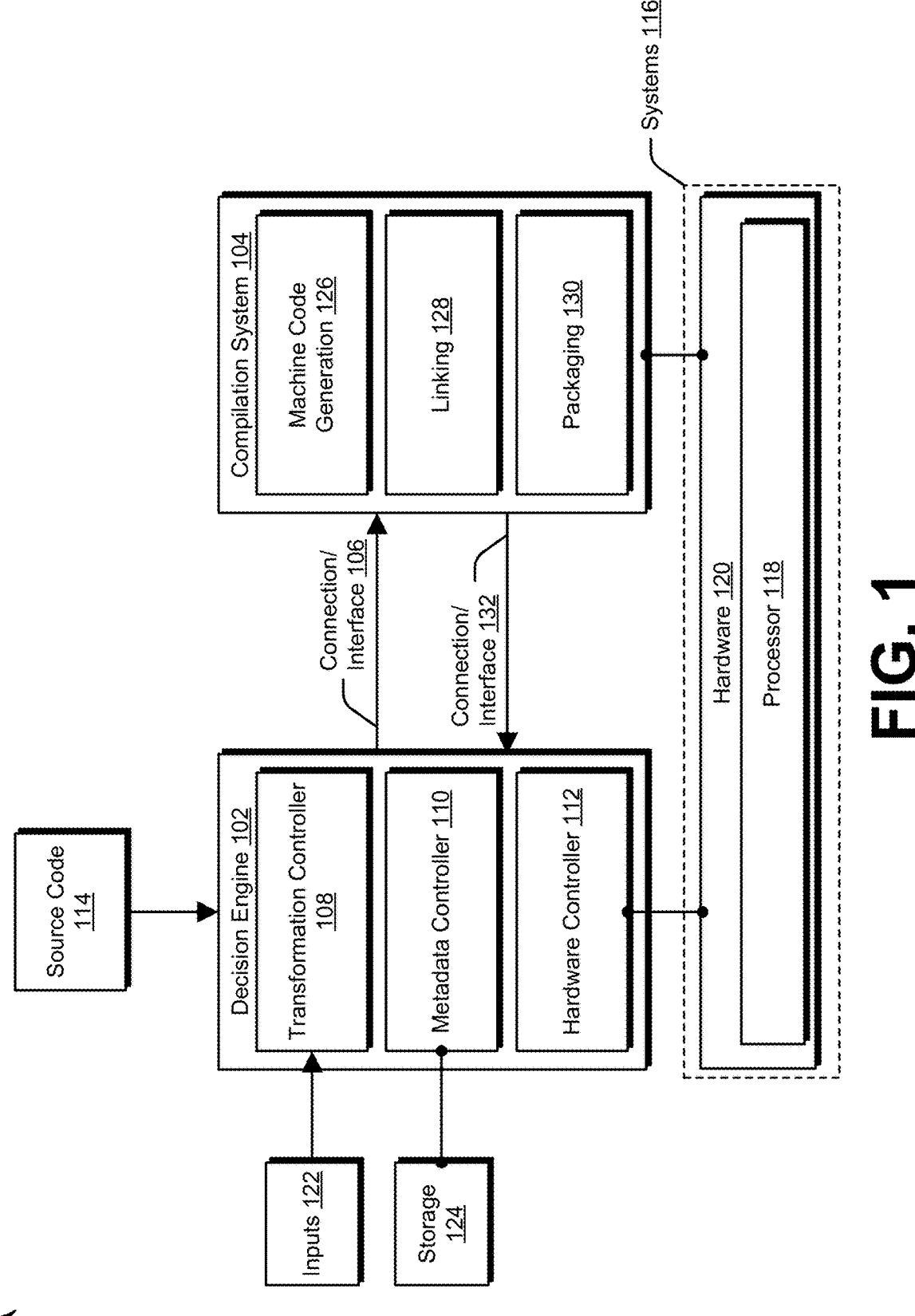
FIG. 1 is a block diagram of a non-limiting example system having a decision engine and a compilation system.

Intermediate representations of high-level source code are utilized by compilers to optimize translation of the high-level source code into low-level machine code which is executable by processors. During the compilation process, higher level intermediate representations of the source code are transformed into lower-level intermediate representations of the source code, and these transformations facilitate generation of the machine code for execution by different types of processors in various hardware architectures and configurations. Specific transformations of the intermediate representations (and orders in which the specific transformations are performed) are either manually specified (e.g., for very-high-value implementations) or predetermined for particular hardware architectures/configurations.

Manually specifying intermediate representation transformations for source code is not practical due to the diversity of available hardware in different generational versions having various operational parameters. Additionally, the predetermined transformations are usable for the particular hardware architectures/configurations but are not optimized for other hardware architectures/configurations. To overcome these problems, selecting intermediate representation transformations for compilation is described. In accordance with the described techniques, a system includes a decision engine and a compilation system which are coupled via an interconnect. In one or more implementations, the decision engine receives source code to be translated into machine code by the compilation system for execution by a processor (or multiple processors) of hardware. For instance, the processor and the hardware are representative of many different types of processors included in various hardware architectures and configurations.

In an example, the decision engine receives inputs which include information such as a description of the processor and/or the hardware, system load characteristics associated with the processor/hardware, availability of composable and programmable components for recomposing or reprogramming the processor and/or the hardware, and so forth. In one or more implementations, the decision engine selects intermediate representation transformations for the source code based on the inputs, and the decision engine updates metadata by writing indications of the intermediate representation transformations to a memory of storage. In some examples, the decision engine selects the intermediate representation transformations based on program costs associated with the transformations that are estimated by a cost model. In these examples, the decision engine selects intermediate representation transformations which minimize the program costs, and the decision engine updates the metadata to describe the program costs associated with the selected intermediate representation transformations.

The decision engine transmits the selected intermediate representation transformations to the compilation system via the interconnect, and the compilation system uses the intermediate representation transformations to compile the source code into low-level machine code which is executable by the processor of the hardware. Unlike conventional systems which use predetermined sets of transformations to compile the source code statically, the decision engine is capable of dynamically selecting and reselecting intermediate representation transformations for the source code in response to changes in the processor and/or the hardware (e.g., based on recomposed/reprogrammed components) changes in the system load characteristics associated with the processor/hardware, etc. Because the metadata describes the indications of previously selected intermediate representation transformations (and associated program costs), the decision engine is also capable of iteratively selecting new intermediate representation transformations to improve performance and recompiling the source code using the previously selected intermediate representation transformations described by the metadata if the new transformations do not improve performance.

In some aspects, the techniques described herein relate to a system including: hardware having a particular configuration, and a decision engine to: receive source code to be compiled by a compilation system for execution by a processor of the hardware, select intermediate representation transformations for the source code based on the particular configuration, and output the intermediate representation transformations to a compilation system.

In some aspects, the techniques described herein relate to a system, wherein selecting the intermediate representation transformations is further based on system load characteristics associated with the hardware.

In some aspects, the techniques described herein relate to a system, wherein selecting the intermediate representation transformations is further based on an estimated availability of a processor to execute machine code produced from the source code.

In some aspects, the techniques described herein relate to a system, wherein selecting the intermediate representation transformations is further based on a cost model that estimates program costs associated with the intermediate representation transformations.

In some aspects, the techniques described herein relate to a system, wherein the intermediate representation transformations are selected iteratively based on a program cost associated with a previously selected intermediate representation transformation for the source code.

In some aspects, the techniques described herein relate to a system, wherein the intermediate representation transformations are selected from a group of predefined intermediate representation transformations.

In some aspects, the techniques described herein relate to a system, wherein a processor to execute machine code produced from the source code includes at least one of a central processing unit, a graphics processing unit, or an accelerated processing unit.

In some aspects, the techniques described herein relate to a system, wherein the intermediate representation transformations include a previously selected intermediate representation transformation for the source code.

In some aspects, the techniques described herein relate to a system, wherein the previously selected intermediate representation transformation for the source code is selected further based on at least one of a program cost estimated by a cost model of the decision engine, a change in system load characteristics associated with the hardware, or a change in the particular configuration.

In some aspects, the techniques described herein relate to a system, wherein the intermediate representation transformations are selected based on metadata describing previously selected intermediate representation transformations for the source code.

In some aspects, the techniques described herein relate to a method including: receiving source code to be compiled by a compilation system for execution by a processor of hardware, selecting intermediate representation transformations for the source code based on system load information associated with the hardware, and outputting the intermediate representation transformations to the compilation system.

In some aspects, the techniques described herein relate to a method, wherein selecting the intermediate representation transformations is further based on a reconfiguration of the hardware.

In some aspects, the techniques described herein relate to a method, further including replacing an intermediate representation transformation of the intermediate representation transformations with a previously selected intermediate representation transformation.

In some aspects, the techniques described herein relate to a method, wherein the intermediate representation transformations represent a directed path through a multi-level intermediate representation graph.

In some aspects, the techniques described herein relate to a method, wherein selecting the intermediate representation transformations is further based on a cost model that estimates program costs associated with the intermediate representation transformations.

In some aspects, the techniques described herein relate to a method including: receiving source code to be compiled by a compilation system for execution by a processor of hardware, selecting intermediate representation transformations for the source code based on a particular configuration of the hardware, and outputting the intermediate representation transformations to the compilation system.

In some aspects, the techniques described herein relate to a method, wherein selecting the intermediate representation transformations is further based on an estimated availability of the processor.

In some aspects, the techniques described herein relate to a method, wherein selecting the intermediate representation transformations is further based on metadata describing previously selected intermediate representation transformations for the source code.

In some aspects, the techniques described herein relate to a method, wherein the intermediate representation transformations include a previously selected intermediate representation transformation for the source code.

In some aspects, the techniques described herein relate to a method, wherein the previously selected intermediate representation transformation for the source code is selected based on at least one of a program cost estimated by a cost model, a change in system load characteristics associated with the hardware, or a change in the particular configuration.

FIG. 1 is a block diagram of a non-limiting example system 100 having a decision engine and a compilation system.

In particular, the system 100 includes decision engine 102 and compilation system 104 which are connected via connection/interface 106. In one or more implementations, the decision engine 102 includes transformation controller 108, metadata controller 110, and hardware controller 112, and the decision engine 102 is illustrated as receiving source code 114.

In accordance with the described techniques, the decision engine 102 and the compilation system 104 are coupled to one another via a wired or wireless connection which is illustrated as the connection/interface 106. Example wired connections include, but are not limited to, buses (e.g., a data bus), interconnects, traces, and planes. The compilation system 104 is capable of compiling high-level code such as the source code 114 into low-level machine code which is executable on a variety of different devices/systems included in systems 116. The systems 116 are illustrated as including a processor 118 of hardware 120; however, examples of devices/systems represented by the processor 118 and/or the hardware 120 include, but are not limited to, supercomputers and/or computer clusters of high-performance computing (HPC) environments, devices/systems that include composable and/or reprogrammable components, devices/systems implemented using Compute Express Link (CXL) for processor-to-device connections and/or processor-to-memory connections, scalable devices of fabric computing environments, servers, personal computers, laptops, desktops, game consoles, set top boxes, tablets, smartphones, mobile devices, virtual and/or augmented reality devices, wearables, medical devices, systems on chips, and other computing devices or systems. For example, the processor 118 is representative of central processing units, graphics processing units, accelerated processing units, field programmable gate arrays (FPGAs), processing-in-memory (PIM) components having in-memory processors, and so forth.

The decision engine 102 is implemented in any of hardware, software, firmware, or a combination thereof. In one example, the decision engine 102 is configured as a microcontroller to perform a variety of operations for selecting intermediate representation transformations for the source code 114 as described above and below. In another example, the decision engine 102 is implemented using hardware, such as an Application Specific Integrated Circuit (ASIC) or other integrated circuit (IC) such as an FPGA to perform a variety of operations for selecting intermediate representation transformations for the source code 114 as described above and below.

In one or more implementations, an intermediate representation is data instantiated within a data structure or code generated and used internally by a compiler and/or virtual machine to represent source code. These intermediate representations are manipulable for compiling with different hardware. A "good" intermediate representation is accurate insofar as it is capable of representing the source code without loss of information and independent of any particular source or target language. Intermediate representations are configurable in a variety of formats, examples of which include but are not limited to an in-memory data structure or a special tuple- or stack-based code readable by a program. An intermediate representation implemented as a special tuple- or stack-based code readable by a program is also referred to as an intermediate language. In accordance with the described techniques, an intermediate representation transformation is a change in form (e.g., from source code to one or more intermediate representations). As used herein, selecting an "intermediate representation transformation" refers to selecting a specified manner or process for transforming source code into an intermediate representation and/or selecting a type or format of the intermediate representation that is to be output based on transforming the source code, such that selecting different intermediate representation transformations transform the source code differently and/or result in different intermediate representations (e.g., that are optimized for or otherwise based on a particular hardware configuration).

The transformation controller 108, the metadata controller 110, and the hardware controller 112 are implemented in any of hardware, software, firmware, or a combination thereof. For instance, the transformation controller 108 is illustrated as receiving inputs 122 which include information leverageable for selecting intermediate representation transformations to optimize compilation of the source code 114. In an example, the inputs 122 include a description of the systems 116 such as types of devices/systems included in the systems 116, available composable/programmable components of the devices/systems included in the systems 116, and so forth. By way of example, if the processor 118 is representative of a graphics processing unit, then the inputs 122 include information such as a number of compute units and whether or not the graphics processing unit is PIM enabled such that an in-memory processor is integrated into a memory module of the graphics processing unit.

As used herein, a "particular configuration" of hardware refers to a specific arrangement, positioning, and/or types of components of the hardware. In one example, for instance, the particular configuration refers to one or more identifiable hardware components that are included as part of the hardware, e.g., a list of the components and numbers of the components that form the hardware. In one or more implementations, the particular configuration includes information about the one or more identifiable hardware components, such as brand, manufacturer, version (e.g., generation), number (e.g., of cores, pins, etc.). Alternatively or in addition, the particular configuration includes information describing capabilities of the one or more identifiable hardware components, such as protocol(s) supported, interfaces, amount of power required, speeds, operating minimums and maximums, and so forth. Further, the particular configuration is capable of accounting for the addition and removal of hardware components, such that adding or removing a hardware component changes a particular configuration to a different particular configuration.

Identifiable hardware components refer to any of a variety of hardware components or sub-components capable of being integrated (e.g., physically) and/or with other hardware. Examples of components which are capable of being integrated and thus forming a particular configuration of hardware include but are not limited to printed circuit boards, silicon wafers, transistors, logic gates, cores, processing units, logic units (e.g., arithmetic logic units), caches, memory (e.g., various types), CPUs, GPUs, field programmable gate arrays (FPGAs), accelerators, accelerated processing units, processor-in-memory (PIM), sockets, network interface cards, interfaces, buses, and so on. In one or more implementations, for example, different generations of a hardware assembly produced by a same company is one example of hardware having different particular configurations, e.g., a legacy version versus a current version. An example of this is different generations of a GPU, for instance. Additionally, hardware assemblies produced by the same company that are different vertical products (e.g., a flagship product versus a value product) is another example of hardware having different particular configurations. Further, comparable hardware assemblies produced by different companies is another example of hardware having different particular configurations. It is to be appreciated that the components which make up a particular configuration of hardware vary widely without departing from the spirit or scope of the described techniques. Moreover, some such components are described herein while other components considered to be within the spirit and the scope of the described techniques are not specifically mentioned herein. In addition to a particular configuration of hardware, in one or more scenarios, selection of an intermediate representation transformation is further based on other aspects, such as programmer "hints" and/or dynamic load characteristics of a load being handled and/or to be handled by hardware, e.g., by a particular configuration of hardware.

In another example, the inputs 122 include programmer "hints" for compiling the source code 114 such as whether or not to use optimization flags, whether or not to enable warning flags, etc. For example, the inputs 122 include dynamic system load characteristics, e.g., associated with the systems 116. In this example, the dynamic system load characteristics are specified, e.g., based on a user input, or the dynamic system load characteristics are determined by the hardware controller 112, e.g., via a connection (e.g., a wired or wireless connection) to the hardware 120 which is representative of the devices/systems included in the systems 116.

In an example, the metadata controller 110 is connected to storage 124 via a wired or wireless connection. The storage 124 includes memory (e.g., a device or system that is used to store information). In one or more implementations, the memory of the storage 124 corresponds to semiconductor memory where data is stored within memory cells on one or more integrated circuits. In an example, the memory corresponds to or includes volatile memory, examples of which include random-access memory (RAM), dynamic random-access memory (DRAM), synchronous dynamic random-access memory (SDRAM), and static random-access memory (SRAM). In some implementations, the memory of the storage 124 corresponds to or includes a cache memory such as a level 1 cache, a level 2 cache, a level 3 cache, and so forth. For example, the memory of the storage 124 represents high bandwidth memory (HBM) in a 3D-stacked implementation. Alternatively or in addition, the memory of the storage 124 corresponds to or includes non-volatile memory, examples of which include solid state disks (SSD), flash memory, read-only memory (ROM), programmable read-only memory (PROM), erasable programmable read-only memory (EPROM), and electronically erasable programmable read-only memory (EEPROM).

In some examples, the metadata controller 110 generates metadata and stores the metadata in the memory of the storage 124. For example, the metadata describes compilation flag information, linker information, application binary interface (ABI) accommodation information, etc. In one example, the transformation controller 108 selects intermediate representation transformations for the source code 114, and the metadata controller 110 records the intermediate representation transformations for the source code 114 using the metadata (e.g., by writing indications of the intermediate representation transformations to the memory of the storage 124). This facilitates functionality such as reverting (e.g., raising) to a previous state of compilation or "location" in a transformation graph by reading the previous state of compilation from the metadata.

The metadata also facilitates program cost-based selection of intermediate representation transformations for the source code 114 in conjunction with a cost model that estimates program costs associated with the intermediate representation transformations. For example, an intermediate representation of the source code 114 is associated with a dialect (e.g., a pre-defined dialect or a custom dialect) of an intermediate representation framework such as a multi-level intermediate representation (MLIR) language/infrastructure. In some examples, the intermediate representation framework includes dialects that are domain-specific as well as dialects that are hardware-specific. Examples of pre-defined dialects include dialects for representing graphs, dialects for performing affine operations and analyses, dialects for representing shaders of a graphics pipeline, dialects for launching graphics processing unit kernels, dialects for representing specific hardware architectures, and so forth.

The cost model determines a program cost associated with an intermediate representation by summing costs of operators included in a dialect associated with the intermediate representation. For instance, the costs of the operators are based on how the operators map to a lower-level language/representation (e.g., LLVM). In one or more implementations, the metadata controller 110 records program costs (or changes in program costs) associated with intermediate representation transformations estimated by the cost model using the metadata (e.g., by writing indications of the estimated program costs to the memory of the storage 124).

Since the metadata describes previous states of compilation and program costs associated with intermediate representations at the previous states of compilation, it is possible for the decision engine 102 to "greedily" select intermediate representation transformations for the source code 114. For example, if the cost model determines that an order of a current set of intermediate representation transformations (e.g., optimizations) for the source code 114 has resulted in suboptimal performance (e.g., the order of the current set is associated with a program cost that is greater than a program cost of a previous state of compilation described by the metadata), then the decision engine 102 implements the transformation controller 108 to raise to the previous state of compilation described by the metadata. In some examples, the cost model determines program costs associated with intermediate representations dynamically based on the dynamic system load characteristics (e.g., HPC load), recomposability (e.g., combinable components), and/or reprogrammability (e.g., changeable component functionality) of devices/systems included in the systems 116. In these examples, the decision engine 102 implements the hardware controller 112 to modify recomposable and/or reprogrammable components of the systems 116 via the connection to the hardware 120.

Consider an example in which the decision engine 102 receives the source code 114 to be compiled by the compilation system 104 for execution by the processor 118 of the hardware 120 which represents processing capabilities of devices/systems included in the systems 116. In order to compile the source code 114 into machine code executable by the processor 118 of the hardware 120, the compilation system 104 is illustrated to include engines for machine code generation 126, linking 128, and packaging 130. Continuing the example, the decision engine 102 selects intermediate representation transformations for the compilation system 104 to utilize for compiling the source code 114 into the low-level machine code which is executable by the processor 118 of the hardware 120. In some examples, the decision engine 102 implements the transformation controller 108 to select the intermediate representation transformations for the source code 114. In these examples, the transformation controller 108 has access to all supported intermediate representation transformations for the source code 114, and the transformation controller 108 selects the intermediate representation transformations from a group of predefined intermediate representation transformations that includes transformations commonly used to compile applications to different backends.

For instance, the decision engine 102 selects intermediate representation transformations to transition from higher-level intermediate representations to lower-level intermediate representations in a manner which optimizes compilation of the high-level source code 114 into the low-level machine code. In order to select the intermediate representation transformations for compiling the source code 114, the decision engine 102 leverages the inputs 122 and/or the metadata stored in the memory of the storage 124. In an example, the decision engine 102 selects the intermediate representation transformations based on the description of the systems 116 such as the types of devices/systems included in the systems 116. In this example, the decision engine 102 implements the transformation controller 108 to select an intermediate representation associated with a dialect that represents a specific hardware architecture of the systems 116 which is available based on the description of the systems 116.

For example, the decision engine 102 selects the intermediate representation transformations based on the dynamic system load characteristics associated with the systems 116 which are included in the inputs 122. In this example, the decision engine 102 implements the transformation controller 108 to select an intermediate representation associated with a dialect that represents a specific hardware architecture of the systems 116 which is underutilized based on the dynamic system load characteristics. In another example, the decision engine 102 selects intermediate representation transformations based on the program costs associated with corresponding intermediate representations described by the metadata. This cost-based selection is performed statically (e.g., in order to determine a set of intermediate representation transformations associated with a lowest program cost) or dynamically (e.g., to recompile the source code 114 to further reduce a program cost associated with the previous set of intermediate representation transformations). The decision engine 102 implements the metadata controller 110 to update the metadata by writing identifiers for selected intermediate representation transformations and indications of program costs associated with corresponding intermediate representations to the memory of the storage 124. By generating and updating the metadata in this way, it is possible to select intermediate representation transformations iteratively based on a program cost estimated by the cost model that is associated with a previously selected intermediate representation transformation for the source code 114 by reading the program cost associated with the previously selected intermediate representation from the metadata.

After selecting the intermediate representation transformations for compilation of the source code 114, the decision engine 102 transmits these intermediate representation transformations to the compilation system 104 via the connection/interface 106 in an example. In this example, the compilation system 104 receives the intermediate representation transformations from the decision engine 102 via the connection/interface 106 and uses the intermediate representation transformations to compile the source code 114 into the machine code for execution by the processor 118 of the hardware 120. For any of a variety of different reasons, it is possible for the decision engine 102 to facilitate a recompilation of the source code 114 into the machine code via an optional connection/interface 132 which couples the decision engine 102 and the compilation system 104 to one another via a wired or wireless connection. For example, the decision engine 102 and the compilation system 104 leverage the connection/interface 132 in order to raise to a previous state of compilation of the source code 114 described by the metadata. However, it is to be appreciated that the decision engine 102 is also capable of facilitating the recompilation of the source code 114 into the machine code via the connection/interface 106. It is also to be appreciated that the system 100 is implementable as a just in time (JIT) compiler or an ahead of time (AOT) compiler.

Figure 2:
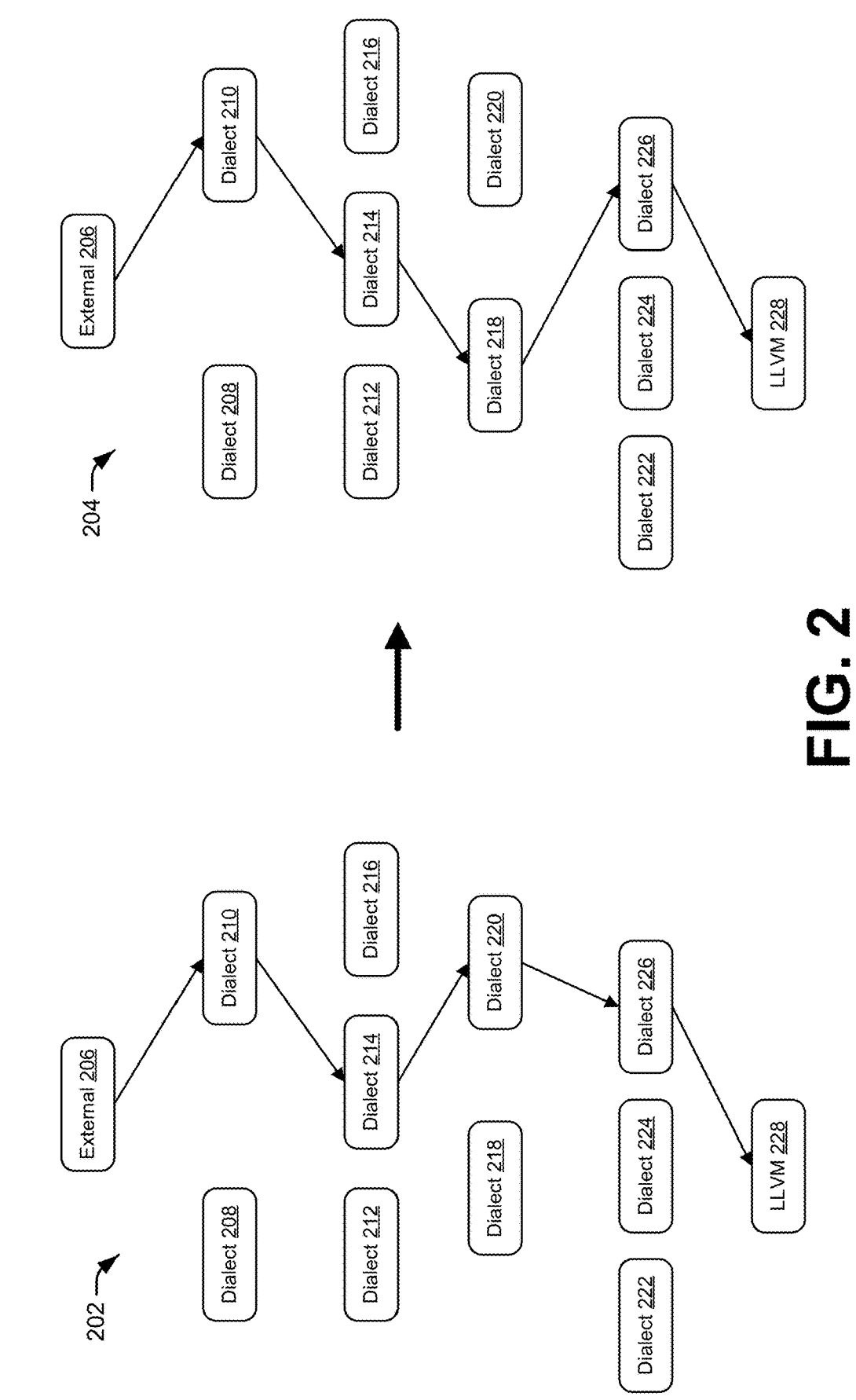
FIG. 2 depicts a non-limiting example of selecting a first set of intermediate representation transformations for source code before a system resource is available and selecting a second set of intermediate representation transformations for the source code after the system resource is available.

FIG. 2 depicts a non-limiting example 200 of selecting a first set of intermediate representation transformations for source code before a system resource is available and selecting a second set of intermediate representation transformations for the source code after the system resource is available.

The example 200 includes a first MLIR graph 202 and a second MLIR graph 204. The example 200 also includes a node external 206 (e.g., corresponding to a language of the source code 114), nodes for dialects 208-226, and a node for LLVM 228. The decision engine 102 receives the source code 114 to be compiled by the compilation system 104 for execution by the processor 118 of the hardware 120 which is representative of processing capabilities of the devices/systems included in the systems 116.

In an example, the transformation controller 108 receives the inputs 122 which include information such as a description of the systems 116 and dynamic system load characteristics associated with the systems 116. In an alternative example, the decision engine 102 implements the hardware controller 112 to determine the description of the systems 116 and the dynamic system load characteristics associated with the systems 116. Based on the source code 114 and information included in the inputs 122, the transformation controller 108 identifies a system resource (e.g., a graphics processing unit) of the systems 116 as being useful for optimizing compilation of the source code 114. However, the system resource is not available, e.g., based on the dynamic system load characteristics associated with the systems 116.

For example, the decision engine 102 selects intermediate representation transformations for the source code 114 based on the unavailability of the system resource of the systems 116. With reference to the first MLIR graph 202, the decision engine 102 implements the transformation controller 108 to select a first intermediate representation transformation for the source code 114. For instance, the first intermediate representation transformation is a lowering from a representation of the source code 114 corresponding to the node external 206 to an intermediate representation associated with dialect 210. In one example, the dialect 210 is a "linalg" dialect.

In an example, the decision engine 102 implements the metadata controller 110 to update the metadata by writing an indication of the first intermediate transformation and a program cost associated with the first intermediate transformation (e.g., estimated by the cost model) to the memory of the storage 124. For instance, the transformation controller 108 selects a second intermediate representation transformation for the source code 114 which is a lowering from the intermediate representation associated with the dialect 210 to an intermediate representation associated with dialect 214. The dialect 214 is a "vector" dialect, an "affine" dialect, an "scf" dialect, etc. In one example, the metadata controller 110 updates the metadata by writing an indication of the second intermediate representation transformation (and a program cost estimated by the cost model that is associated with the second intermediate representation transformation) to the memory of the storage 124.

Consider an example in which dialect 218 is for representing the system resource. In this example, because the system resource is unavailable, the transformation controller 108 selects a third intermediate representation transformation for the source code 114. The third intermediate representation transformation is a lowering from the intermediate representation associated with the dialect 214 to an intermediate representation associated with dialect 220. For example, the transformation controller 108 selects a fourth intermediate representation transformation for the source code 114 which is a lowering from the intermediate representation associated with the dialect 220 to an intermediate representation associated with dialect 226. In this example, the intermediate representation associated with the dialect 226 is lowered to the LLVM 228 which outputs the machine code that is executable by the processor 118 of the hardware 120. As shown in the example 200, the first, second, third, and fourth intermediate representation transformations represent a directed path through the first MLIR graph 202.

Continuing the example, the metadata controller 110 updates the metadata by writing indications of the third and fourth intermediate representation transformations and program costs associated with the third and fourth intermediate representation transformations to the memory of the storage 124. The decision engine 102 transmits the intermediate representation transformations illustrated in the first MLIR graph 202 to the compilation system 104 via the connection/interface 106. For example, the compilation system 104 receives the intermediate representation transformations, and the compilation system 104 uses the intermediate representation transformations to compile the source code 114 for execution by the processor 118 of the hardware 120 which is representative of processing capabilities of the devices/systems included in the systems 116.

Consider another example in which the system resource becomes available, e.g., the transformation controller 108 receives the inputs 122 as including information indicating that the system resource is available or the hardware controller 112 determines that the system resource is available. For example, the decision engine 102 receives the source code 114 for recompilation via the connection/interface 132. With reference to the second MLIR graph 204, the decision engine 102 implements the metadata controller 110 to read indications of the first, second, third, and fourth intermediate representation transformations from the metadata. In an example, the decision engine 102 implements the transformation controller 108 to raise to the intermediate representation associated with the dialect 214 in the second MLIR graph 204.

Continuing the example, the transformation controller 108 selects a fifth intermediate representation transformation for the source code 114 which is a lowering from the intermediate representation associated with the dialect 214 to an intermediate representation associated with the dialect 218 for representing the system resource. For instance, the transformation controller 108 selects a sixth intermediate representation transformation for the source code 114 which is a lowering from the intermediate representation associated with the dialect 218 to an intermediate representation associated with the dialect 226. In an example, the intermediate representation associated with the dialect 226 is lowered to the LLVM 228 which outputs the machine code that is executable by the processor 118 of the hardware 120. In this example, the metadata controller 110 updates the metadata by writing indications of the fifth and sixth intermediate representation transformations (and program costs estimated by the cost model that are associated with the fifth and sixth intermediate representation transformations) to the memory of the storage 124.

Figure 3:
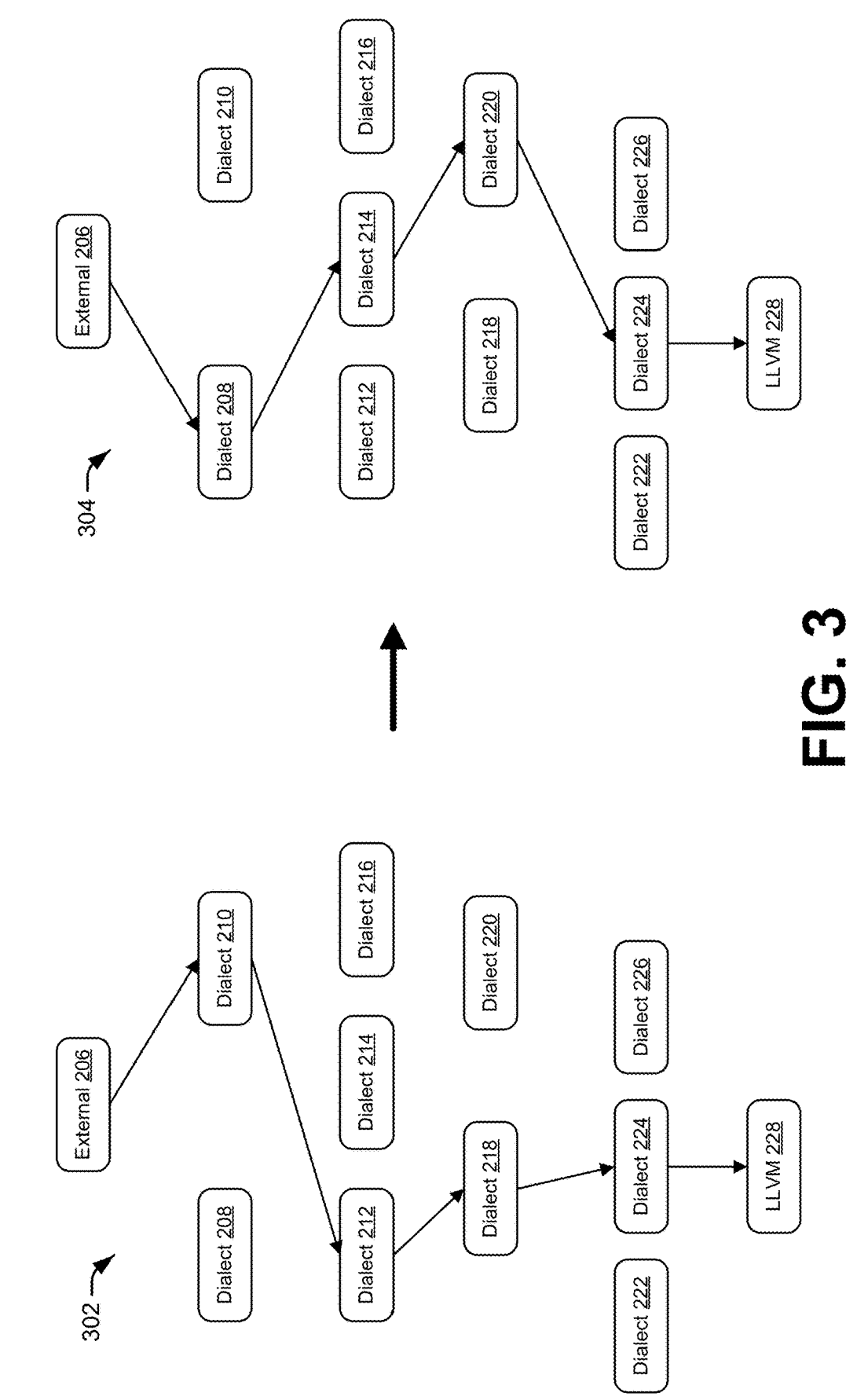
FIG. 3 depicts a non-limiting example of selecting a first set of intermediate representation transformations for source code based on first conditions and selecting a second set of intermediate representation transformations for the source code based on second conditions.

FIG. 3 depicts a non-limiting example 300 of selecting a first set of intermediate representation transformations for source code based on first conditions and selecting a second set of intermediate representation transformations for the source code based on second conditions.

The example 300 includes an initial MLIR graph 302 and a modified MLIR graph 304. The first set of intermediate representation transformations for the source code 114 which is selected based on the first conditions is illustrated in the initial MLIR graph 302. For instance, the initial MLIR graph 302 includes a lowering from a representation of the source code 114 corresponding to the node external 206 to an intermediate representation associated with the dialect 210; a lowering from the intermediate representation associated with the dialect 210 to an intermediate representation associated with dialect 212; a lowering from the intermediate representation associated with the dialect 212 to an intermediate representation associated with the dialect 218; a lowering from the intermediate representation associated with the dialect 218 to an intermediate representation associated with dialect 224; and a lowering from the intermediate representation associated with the dialect 224 to the LLVM 228.

The second set of intermediate representation transformations for the source code 114 which is selected based on the second conditions is illustrated in the modified MLIR graph 304. For example, the second set of intermediate representation transformations includes a lowering from a representation of the source code 114 corresponding to the node external 206 to an intermediate representation associated with dialect 208; a lowering from the intermediate representation associated with the dialect 208 to an intermediate representation associated with the dialect 214; a lowering from the intermediate representation associated with the dialect 214 to an intermediate representation associated with the dialect 220; a lowering from the intermediate representation associated with the dialect 220 to an intermediate representation associated with the dialect 224; and a lowering from the intermediate representation associated with the dialect 224 to the LLVM 228.

It is to be appreciated that changes from the first conditions to the second conditions are caused by a variety of different scenarios or circumstances. Examples of such scenarios/circumstances include changes in the dynamic system load characteristics associated with the systems 116 and/or changes to a description of the systems 116 (e.g., additions to or reductions from the devices/systems included in the systems 116). For example, the hardware controller 112 changes functionality of reprogrammable components of devices/systems included in the systems 116 and/or the hardware controller 112 recomposes recomposable components of devices/systems included in the systems 116. In other examples, the first and second conditions are representative of "greedy" iterative raising/lowering of intermediate representations of the source code 114 based on program costs estimated by the cost model. In another example, the first and second conditions are representative of changes in the source code 114, the inputs 122, the compilation system 104, processor-to-device connections, processor- to memory connections, and so forth. In one example, the first and second conditions are representative of a reconfiguration of the hardware 120, replacing an intermediate representation transformation of the intermediate representation transformations with previously selected intermediate representation transformations, etc.

Figure 4:
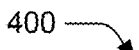
FIG. 4 depicts a procedure in an example implementation of selecting intermediate representation transformations for compilation.

FIG. 4 depicts a procedure 400 in an example implementation of selecting intermediate representation transformations for compilation.

Source code is received to be compiled by a compilation system for execution by a processor of hardware having a particular configuration (block 402). In an example, the decision engine 102 receives the source code 114 to be compiled by the compilation system 104 for execution by the processor 118 of the hardware 120. In one example, the particular configuration is described by information included in the inputs 122 received by the transformation controller 108. In another example, the hardware controller 112 determines the particular configuration via the connection with the hardware 120.

Intermediate representation transformations are selected for the source code based on the particular configuration (block 404). For example, the decision engine 102 implements the transformation controller 108 to select the intermediate representation transformations for the source code 114 based on the particular configuration of the hardware 120 which is representative of the devices/systems included in the systems 116. In some examples, the decision engine 102 implements the metadata controller 110 to update the metadata by writing indications of the intermediate representation transformations to the memory of the storage 124.

The intermediate representation transformations are output to the compilation system (block 406). In one example, the decision engine 102 transmits the intermediate representation transformations to the compilation system 104 via the connection/interface 106. For example, the compilation system 104 receives the intermediate representation transformations via the connection/interface 106, and the compilation system 104 uses the intermediate representation transformations to compile the source code 114 into the machine code which is executable by the processor 118 of the hardware 120.

Figure 5:
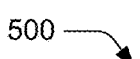
FIG. 5 depicts a procedure in an additional example implementation of selecting intermediate representation transformations for compilation.
Figure 5:
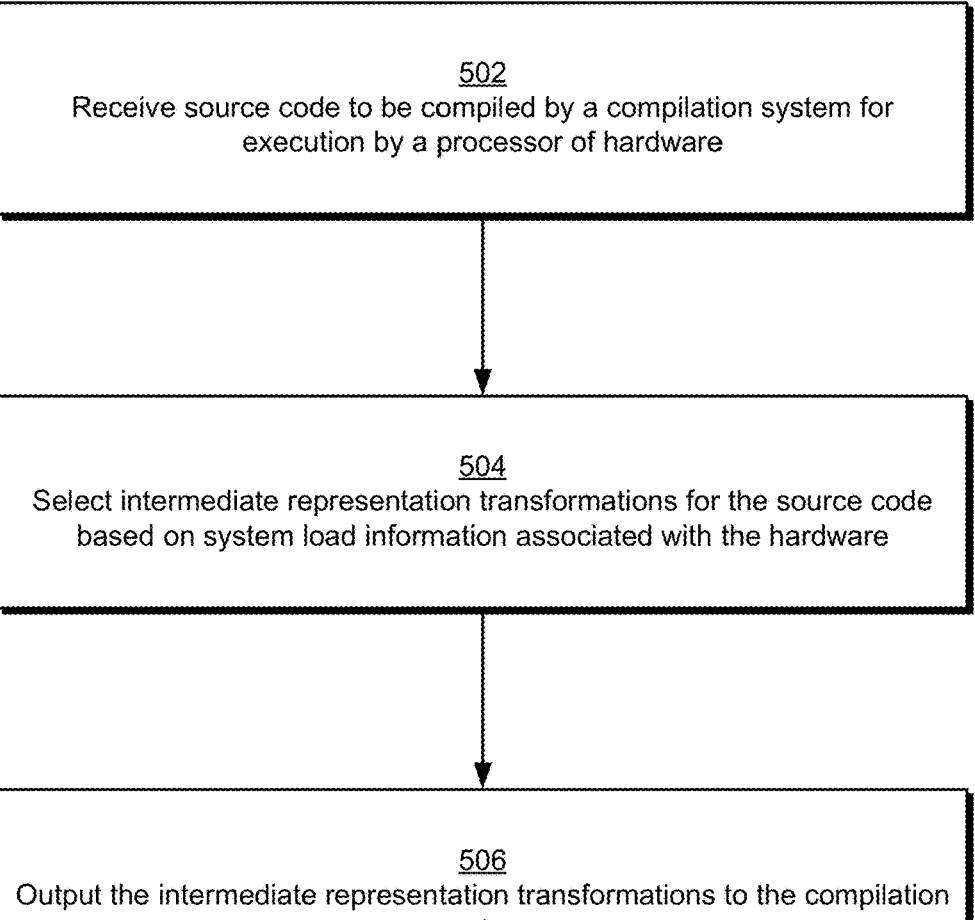

FIG. 5 depicts a procedure 500 in an additional example implementation of selecting intermediate representation transformations for compilation.

Source code is received to be compiled by a compilation system for execution by a processor of hardware (block 502). For example, the decision engine 102 receives the source code 114 to be compiled by the compilation system 104 for execution by the processor 118 of the hardware 120. In this example, the processor 118 and/or the hardware 120 are representative of a variety of devices/systems included in the systems 116.

Intermediate representation transformations are selected for the source code based on system load information associated with the hardware (block 504). In an example, the decision engine 102 implements the transformation controller 108 to select the intermediate representation transformations, and the transformation controller 108 receives the inputs 122. For example, the system load information is included in the inputs 122.

The intermediate representation transformations are output to the compilation system (block 506). In one example, the decision engine 102 transmits the intermediate representation transformations to the compilation system 104 via the connection/interface 106. For example, the compilation system 104 receives the intermediate representation transformations and uses the intermediate representation transformations to compile the source code 114 into the machine code for execution by the processor 118. In an example, the decision engine 102 implements the metadata controller 110 to update the metadata by writing indications of the intermediate representation transformations to the memory of the storage 124.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the decision engine 102 and the compilation system 104) are implemented in any of a variety of different manners such as hardware circuitry, software or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), one or more Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A system comprising:
hardware having a particular configuration;
decision circuitry to:
receive a set of previously output intermediate representation transformations for source code representing a path through a multi-level intermediate representation (MLIR) structure that includes dialects at multiple levels, wherein a transition between the dialects at different levels of the MLIR structure represents an intermediate representation transformation of the source code; and
output different intermediate representation transformations for the source code based on the particular configuration of the hardware by selecting a different path through the MLIR structure, the different path including a dialect representing a system resource selected in response to the system resource becoming available; and
compilation circuitry to compile the source code into machine code using the different intermediate representation transformations.

2. The system of claim 1, wherein the decision circuitry is further configured to output the different intermediate representation transformations based on system load characteristics associated with the hardware.

3. The system of claim 1, wherein the decision circuitry is further configured to output the different intermediate representation transformations based on an estimated availability of a processor to execute the machine code produced from the source code.

4. The system of claim 1, wherein the decision circuitry is further configured to output the different intermediate representation transformations based on a cost model that estimates program costs associated with the different intermediate representation transformations.

5. The system of claim 4, wherein the decision circuitry is configured to iteratively output the different intermediate representation transformations based on a program cost associated with a previously selected intermediate representation transformation for the source code.

6. The system of claim 4, wherein the decision circuitry is configured to estimate a program cost associated with an intermediate representation by summing costs of operators included in a particular dialect associated with the intermediate representation.

7. The system of claim 1, wherein the different intermediate representation transformations are selected from a group of predefined intermediate representation transformations.

8. The system of claim 1, further comprising a processor to execute the machine code produced from the source code, the processor including at least one of a central processing unit, a graphics processing unit, or an accelerated processing unit.

9. The system of claim 1, wherein the different intermediate representation transformations include a previously output intermediate representation transformation from the set, the previously output intermediate representation transformation selected based on at least one of a program cost estimated by a cost model of the decision circuitry, a change in system load characteristics associated with the hardware, or a reconfiguration of the hardware.

10. The system of claim 1, wherein the decision circuitry is further configured to output the different intermediate representation transformations based on metadata describing the previously output intermediate representation transformations for the source code.

11. The system of claim 1, wherein the hardware reconfigures from a first configuration to the particular configuration.

12. The system of claim 1, wherein the different path includes at least one of the previously output intermediate representation transformations.

13. The system of claim 1, wherein the set of previously output intermediate representation transformations is selected before the system resource becomes available, and the different intermediate representation transformations are selected while the system resource is available.

14. The system of claim 1, wherein the decision circuitry is configured to output the different intermediate representation transformations by reverting to a previous state of compilation representing an intermediate level of the path through the MLIR structure.

15. The system of claim 1, wherein the dialect is a hardware-specific dialect representing a processor of the hardware.

16. A method comprising:

receiving source code to be compiled by compilation circuitry for execution by hardware having a particular configuration;

receiving a set of previously output intermediate representation transformations for the source code representing a path through a multi-level intermediate representation (MLIR) structure that includes dialects at multiple levels, wherein a transition between the dialects at different levels of the MLIR structure represents an intermediate representation transformation of the source code;

output different intermediate representation transformations for the source code based on the particular configuration of the hardware by selecting a different path through the MLIR structure, the different path including a dialect representing a system resource selected in response to the system resource becoming available; and compiling, by the compilation circuitry, the source code into machine code using the different intermediate representation transformations.

17. The method of claim 16, wherein the set of previously output intermediate representation transformations is selected before the system resource becomes available.

18. A method comprising:

receiving source code to be compiled by compilation circuitry for execution by hardware;

reconfiguring the hardware from a first configuration to a second configuration;

receiving first intermediate representation transformations for the source code representing a path through a multi-level intermediate representation (MLIR) structure that includes dialects at multiple levels, wherein a transition between the dialects at different levels of the MLIR structure represents an intermediate representation transformation of the source code, and the first intermediate representation transformations are associated with the first configuration;

outputting second intermediate representation transformations for the source code based on the second configuration of the hardware by selecting a different path through the MLIR structure, the different path including a dialect representing a system resource selected in response to the system resource becoming available; and compiling, by the compilation circuitry, the source code into machine code using the second intermediate representation transformations.

19. The method of claim 18, wherein the second intermediate representation transformations include a previously output intermediate representation transformation of the first intermediate representation transformations for the source code.

20. The method of claim 19, wherein the previously output intermediate representation transformation for the source code is selected based on at least one of a program cost estimated by a cost model, a change in system load characteristics associated with the hardware, or a reconfiguration of the hardware.

\* \* \* \* \*